United States Patent
Krannich et al.

(10) Patent No.: US 9,021,019 B2
(45) Date of Patent: Apr. 28, 2015

(54) BUSINESS APPLICATION PLATFORM WITH EMBEDDED BUSINESS INTELLIGENCE SERVER

(75) Inventors: Bernd Krannich, Sinsheim (DE); Timm Falter, Sinsheim (DE); Martin Hartig, Speyer (DE); Achim Braemer, Heidelberg (DE); Craig Chaplin, North Vancouver (CA)

(73) Assignee: SAP SE, Walldorf (DE)

( * ) Notice: Subject to any disclaimer, the term of this patent is extended or adjusted under 35 U.S.C. 154(b) by 273 days.

(21) Appl. No.: 13/619,841

(22) Filed: Sep. 14, 2012

(65) Prior Publication Data

US 2014/0082047 A1     Mar. 20, 2014

(51) Int. Cl.
G06F 15/16     (2006.01)
G06F 9/54      (2006.01)
G06Q 10/10     (2012.01)

(52) U.S. Cl.
CPC ............. *G06F 9/54* (2013.01); *G06Q 10/103* (2013.01)

(58) Field of Classification Search
CPC ............................. G06F 9/54; G06Q 10/103
See application file for complete search history.

(56) References Cited

U.S. PATENT DOCUMENTS

| | | | |
|---|---|---|---|
| 7,260,577 B1 * | 8/2007 | Alavi et al. | 1/1 |
| 7,861,253 B1 * | 12/2010 | Lettington et al. | 719/328 |
| 2006/0089939 A1 * | 4/2006 | Broda et al. | 707/100 |
| 2008/0077656 A1 * | 3/2008 | Broda | 709/203 |
| 2008/0140671 A1 * | 6/2008 | Tien et al. | 707/10 |
| 2008/0141237 A1 * | 6/2008 | Elad et al. | 717/171 |
| 2008/0271059 A1 * | 10/2008 | Ott et al. | 719/328 |
| 2009/0006543 A1 * | 1/2009 | Smit | 709/203 |
| 2011/0004633 A1 * | 1/2011 | Kantorova et al. | 707/802 |
| 2011/0320366 A1 * | 12/2011 | Lalji et al. | 705/301 |
| 2013/0117719 A1 * | 5/2013 | Bender et al. | 715/866 |
| 2013/0139069 A1 * | 5/2013 | Ciancio-Bunch | 715/752 |
| 2013/0254755 A1 * | 9/2013 | Yousouf et al. | 717/170 |
| 2014/0201331 A1 * | 7/2014 | Kershaw et al. | 709/219 |

* cited by examiner

*Primary Examiner* — Hassan Kizou
*Assistant Examiner* — Phyllis Book
(74) *Attorney, Agent, or Firm* — Mintz Levin Cohn Ferris Glovsky and Popeo, P.C.

(57) ABSTRACT

A system is provided in which at least one first server comprises at least one data processor executing a business application platform providing various business applications for access by at least one remote client. In addition, at least one second server comprises at least one data processor executing an embedded business intelligence server (EBIS). The EBIS provides an interface to the platform to at least one business intelligence applications providing business intelligence functionality. With such a system, a unified interface can be rendered on the at least one remote client concurrently provides functionality from the platform and the at least one business intelligence client. Related apparatus, systems, techniques and articles are also described.

21 Claims, 5 Drawing Sheets

US 9,021,019 B2

BUSINESS APPLICATION PLATFORM WITH EMBEDDED BUSINESS INTELLIGENCE SERVER

TECHNICAL FIELD

The subject matter described herein relates to a business application platform such as an Advanced Business Application Programming (ABAP) platform that includes an embedded business intelligence server providing business intelligence functionality.

BACKGROUND

Applications providing analysis of large data volumes are typically not optimized for visualization of data to the end user. For an integrated solution, application-specific coding is required that provides for acquiring the data and transforming the data into an adequate representation. An alternative is to use a separate business intelligence server having a different interface; however, such an arrangement introduces additional system landscape complexity and, therefore, the total cost of ownership.

SUMMARY

In a first aspect, a system includes at least one first server and at least one second server. The at least one first server comprises at least one data processor executing a business application platform providing various business applications for access by at least one remote client. The at least one second server comprises at least one data processor executing an embedded business intelligence server (EBIS). The EBIS provides an interface to the platform to at least one business intelligence applications providing business intelligence functionality. With such a system, a unified interface can be rendered on the at least one remote client concurrently provides functionality from the platform and the at least one business intelligence client.

In an interrelated aspect, one or more business application are executed on a business application platform. In addition, one or more business intelligence client applications providing business intelligence functionality are executed via an EBIS that provides an interface to the platform so that the business intelligence applications can be executed concurrently with the business applications. The executing one or more business applications and the executing one or more business intelligence applications can be displayed concurrently in a unified interface at the client.

The platform can be an advanced business application programming (ABAP) platform. A real-time analytics platform can be coupled to the platform to provide real-time analytics to the client. The real-time analytics platform can include an in-memory columnar data store. The platform can communicate with the remote client(s) via representational state transfer (RESTful) services and/or using JAVASCRIPT.

In addition, user can be authenticated by the platform on behalf of the EBIS. For example, authentication requests can be dispatched to the platform and, in response, the platform can issue, for each request, a reentrance ticket to open a connection to the platform within a pre-defined period of time. In addition, the reentrance ticket can be handed to the EBIS to establish a remote functional call (RFC) connection to the platform during a lifetime of a corresponding session.

Computer program products are also described that comprise non-transitory computer readable media storing instructions, which when executed one or more data processor of one or more computing systems, causes at least one data processor to perform operations herein. Similarly, computer systems are also described that may include one or more data processors and a memory coupled to the one or more data processors. The memory may temporarily or permanently store instructions that cause at least one processor to perform one or more of the operations described herein. In addition, methods can be implemented by one or more data processors either within a single computing system or distributed among two or more computing systems.

The subject matter described herein provides many advantages. For example, the current subject matter provides a business application and analytics platform with an embedded business intelligence server that, in turn, provides enhanced usability and functionality for end-users. In particular, the current subject matter can be used to provide a single integrated solution to create and run applications that combine transactional and analytical aspects.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

The embedded business intelligence server (EBIS) as described herein can be used with applications to combine the processing of detailed, transactional data (e.g., single record read/write scenarios) with analytics. This, in turn, can provide the user with an overview on an entire set of transactional data records created or a subset of the transactional data records (e.g., all transactional data records created by this user, all transactional data records created by the company this year, etc.). Not only can such applications display the aggregated data to the user, but an "insight-to-action" loop can be enabled by which the user may draw a conclusion from the provided analytics, which again can trigger the creation or modification of single, detailed transactional data records.

Figure 1:
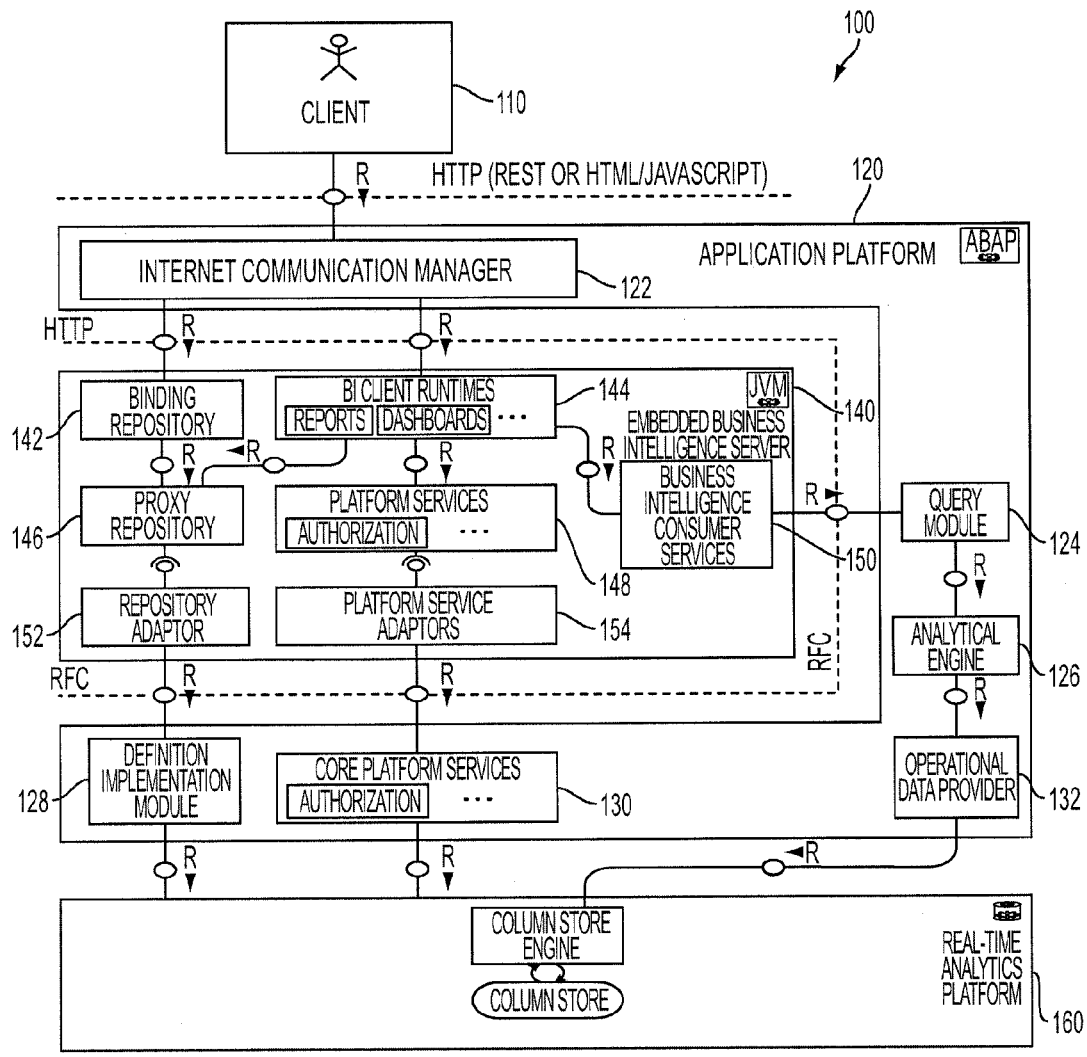
FIG. 1 is a system architecture diagram illustrating a platform with an embedded business intelligence server (EBIS)

FIG. 1 is a diagram 100 illustrating a system architecture for implementing an embedded business intelligence server (EBIS). A client 110 can communicate with an instance of an application platform 120 via HTTP (for example, using RESTful web services and/or HTML/JavaScript). The platform 120 can be encoded in Advanced Business Application Programming (ABAP) language, and therefore may be an ABAP platform. The application platform 120, in turn, can communicate with an instance of an embedded business intelligence server (EBIS) 140 via HTTP and/or via remote function calls (RFC). In addition, the application platform 120 can also communicate with a real-time analytics platform 160 (e.g., SAP HANA platform) via RFC.

The application platform 120 can comprise an Internet Communication Manager module 122 which provides an interface via which the client 110 can communicate with the application platform 120 as well as the EBIS 140. A query module 124 can interface with the EBIS 140, providing a mechanism for defining queries (e.g., by selecting and combining characteristics and key figures or reusable structures in a query, etc.) which can be executed using a business information warehouse (BW) analytical engine 126 that interacts transiently with the EBIS 140 via a transient operational data provider (ODP) 132. The application platform 120 can also include a definition implementation module 128 for persisting and managing application definitions specified by business intelligence applications such as Crystal Reports, Zen, etc. The definition implementation module 128 can be implemented as a TLOGO ABAP implementation module. The application platform 120 also includes a core platform services module 130 that can communicate with a platform services module 148 of the EBIS 140 via platform service adaptors 154 in the EBIS 140.

The EBIS 140 can be an embeddable business intelligence server using a Java-based business intelligence service (e.g., a Java virtual machine (JVM), etc) container comprising a lean Java server (LJS) (a tomcat-based servlet container), the core of EBIS, and business intelligence clients. In particular, EBIS 140 can comprise a REST Binding Repository 142 and a Proxy Repository 146 that can provide platform service APIs to allow for the consumption of such APIs for the services which the EBIS 140 provides to its consumers and business intelligence clients sitting within the EBIS 140 (e.g., identity/access/authorization, management, repository, etc.). A Repository Adaptor 152 can provide an RFC-based API that exposes the application platform 120 via RFC.

A business intelligence (BI) client runtimes module 144 can provide various business intelligence services including applications for reporting, document rendering, and printing (e.g. Crystal Report), applications providing analysis and design for dashboards (e.g. ZEN-SAP Business Objects Analysis) or other analytical applications such as those for ad-hoc reporting, data exploration, and statistical analysis. Other tools/applications can be integrated via the BI client runtimes module 144 to provide, for example, Eclipse design time functionality (however, other design time environments can be used) and browser-based runtime business intelligence functionality. A platform services module 148 can provide service provider interfaces to be implemented for each platform into which the EBIS 140 is embedded. Platform service adaptors 154 can provide an implementation of the EBIS platform service APIs for consuming platform services implemented in the application platform 120. In addition, a business intelligence consumer services module (BICS) 150 can provide a business intelligence API for data access and additionally has an RFC interface to the application platform 120.

The real-time analytics platform 160 can be an SAP HANA platform that stores data in a columnar fashion in a column store 164. The application platform 120 access a column store 164 (providing in-memory database functionality) via a column store engine 162 which can be coupled to the transient operational data provider 132 of the EBIS 140.

With HANA implementations, an ABAP EBIS integration can be built based on data models built in HANA and exposed on the one hand via a platform for transactional processing to work with single entities/records and create, update, read and delete them and on the other hand transiently via an infrastructure such as the SAP BW Operational Data Provider (ODP) infrastructure to work and analyze aggregated data using HANA analytical views and corresponding SAP BW OLAP cubes processed in the SAP BW Analytical Engine. As an Application Server (AS) ABAP delivery contains the software component SAP_BW, the core functionality of the SAP_BW can be included. Specifically, (Data) Warehouse Management, Analytical Engine, the corresponding APIs for client access (BI Consumer Services, BICS) can be included, allowing applications to consume analytical data and combine them with their transactional user interface, and to consume this data in the business intelligence clients that may be part of the EBIS 140.

Users/identities can be completely managed via a user management module (not shown) of the application platform 120. For authentication/authorization, the corresponding requests can be dispatched to the application platform 120. The application platform 120 can issue a reentrance ticket which can be used, for example, within 2 minutes, to open a connection to the application platform 120. This ticket can be handed over to the EBIS 140 to establish an RFC connection to the application platform 120 which can then be kept open for the lifetime of the session on the lean Java server (LJS).

Figure 2:
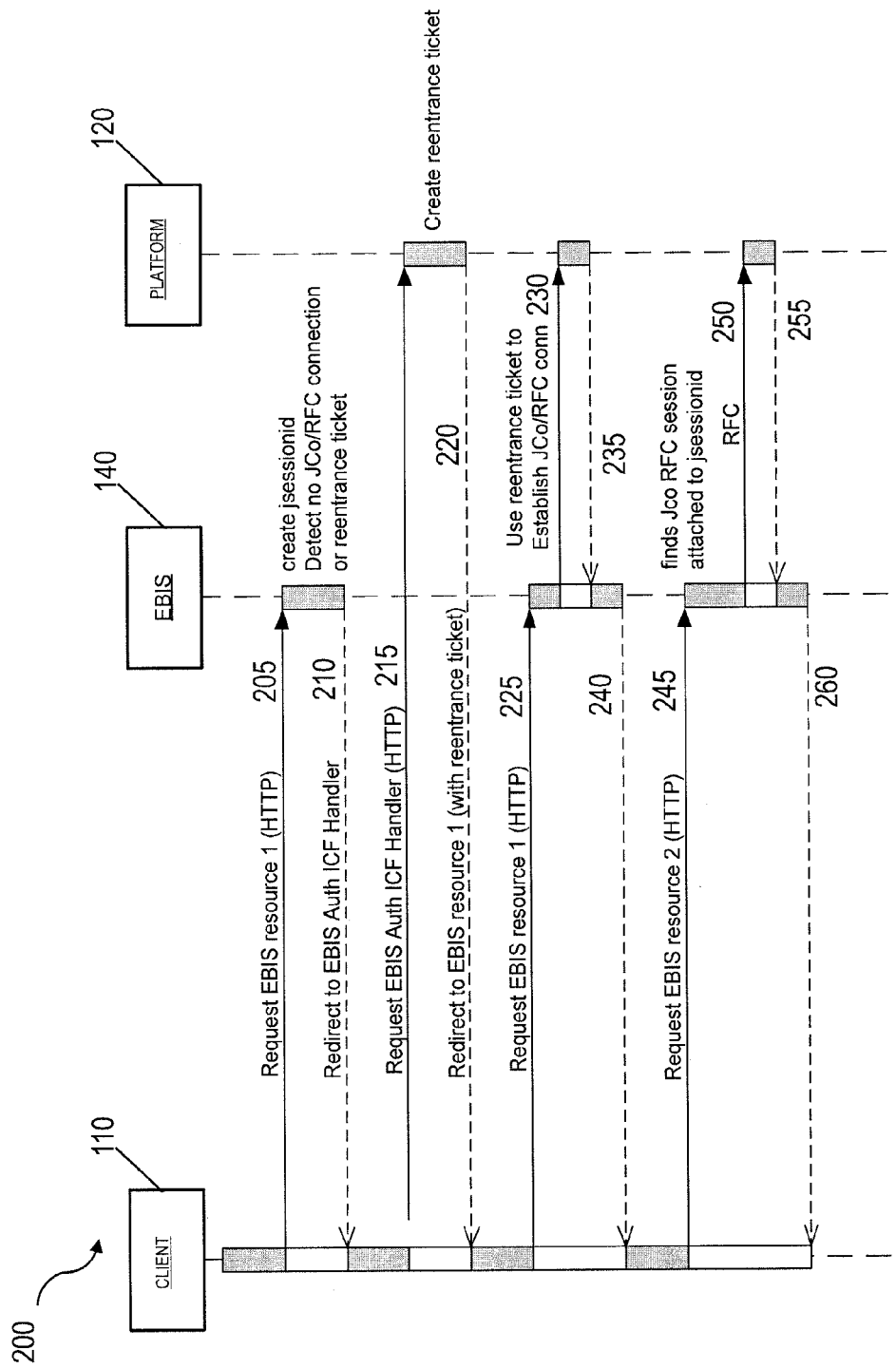
FIG. 2 is a diagram illustrating data flow among a client, EBIS, and the platform in connection with user authentication.

FIG. 2 is a data flow diagram illustrating data flow among the client 110 (e.g., web browser, etc.), the EBIS 140, and the application platform 120 as part of authentication. The client 110, such as a web browser, requests, at 205, an EBIS resource 1 from EBIS 140 (via HTTP). At this point, the EBIS 140 creates a new session (jsessionid). If no JCo/RFC connection or reentrance ticket is detected, at 210, the request can be redirected back to the client 110 indicating that the EBIS Authorization Internet Connection Framework (ICF) Handler should be polled. Thereafter, the client 110, at 215, requests the EBIS Authorization ICF Handler from the application platform 120 (via HTTP). The application platform 120 then creates a reentrance ticket and, at 220, redirects EBIS resource 1 with a reentrance ticket to the client 110. The client 110 then requests, at 225, the EBIS resource 1 (via HTTP) from the EBIS 140. The EBIS 140 then, at 230, uses the reentrance ticket to establish a JCo/RFC connection with the application platform 120 (which later, at 235, confirms such connection). The EBIS 140, at 240, then provides data responsive to the EBIS resource 1 request to the client 110. The client 110, later, at 245, sends an EBIS resource 2 request to the EBIS 140. The EBIS 140, at 250, finds a JcO/RFC session attached to the jsessionID, so that at 255, the user can be authenticated. Thereafter, at 260, the EBIS 140 provides data responsive to the EBIS resource 2 request.

The following describes how the different types of users of the EBIS 140—an end user, a developer of EBIS content, and an ABAP administrator—are exposed to the EBIS 140.

End User.

The end user is that should not be able to distinguish, on a web browser, that a certain part of the application is provided by the EBIS 140 and certain parts of the application are directly served via the application platform 120. For example, the end user can receive a browser-based, HTML page in a user interface, and the end user should not be able to distinguish which parts of the HTML page rendered in the browser UI are from the EBIS 140 and which parts of the HTML page rendered in the browser UI are from the application platform 120. In particular, the HTML page can be a UI5 HMTL page. Thus, the end user should experience a smooth UI integration of HTML UIs with the HTML that is generated by EBIS 140.

Figure 3:
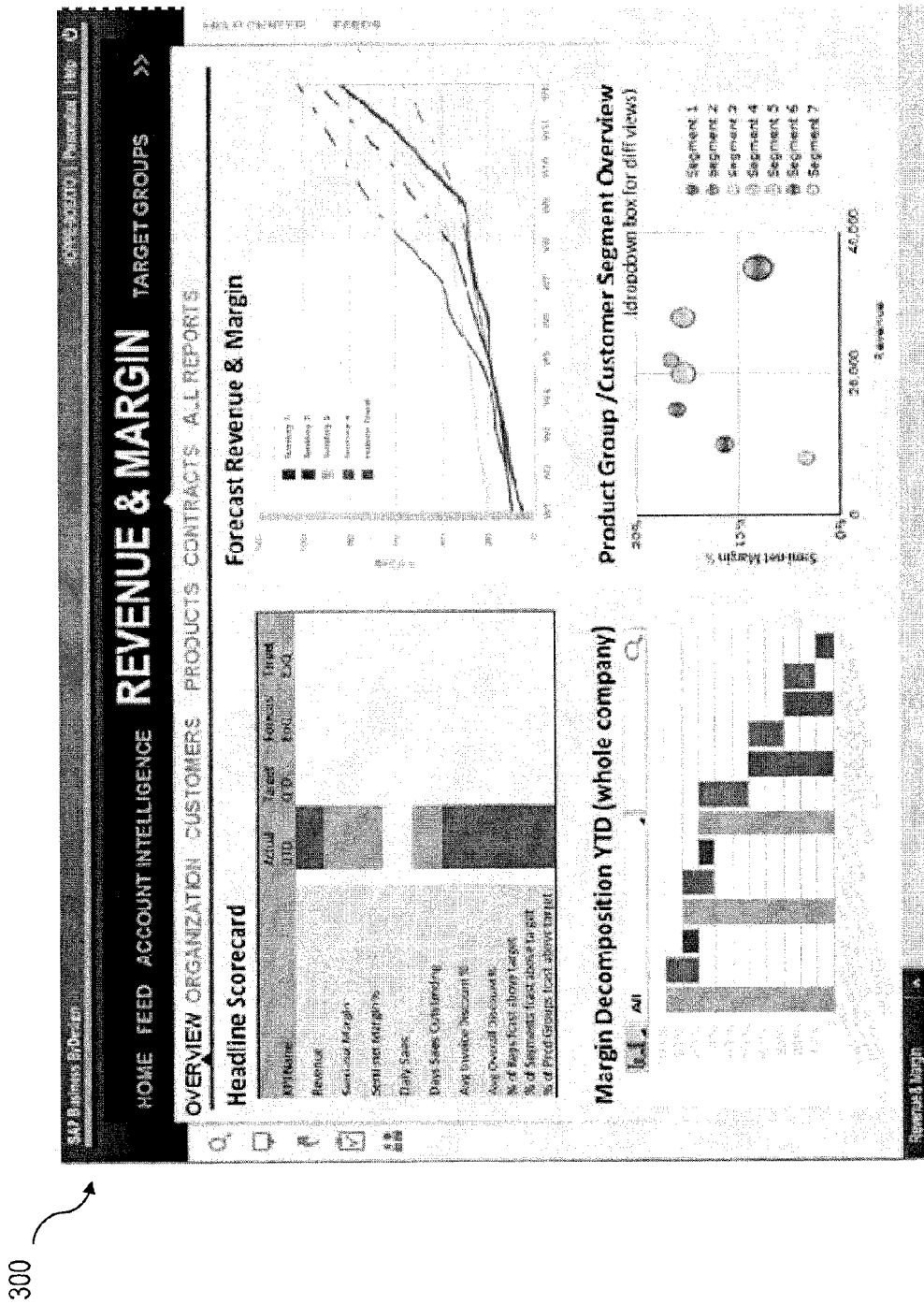
FIG. 3 is a first screenshot illustrating an application enabling transactional record updates and displaying analytical content.
Figure 4:
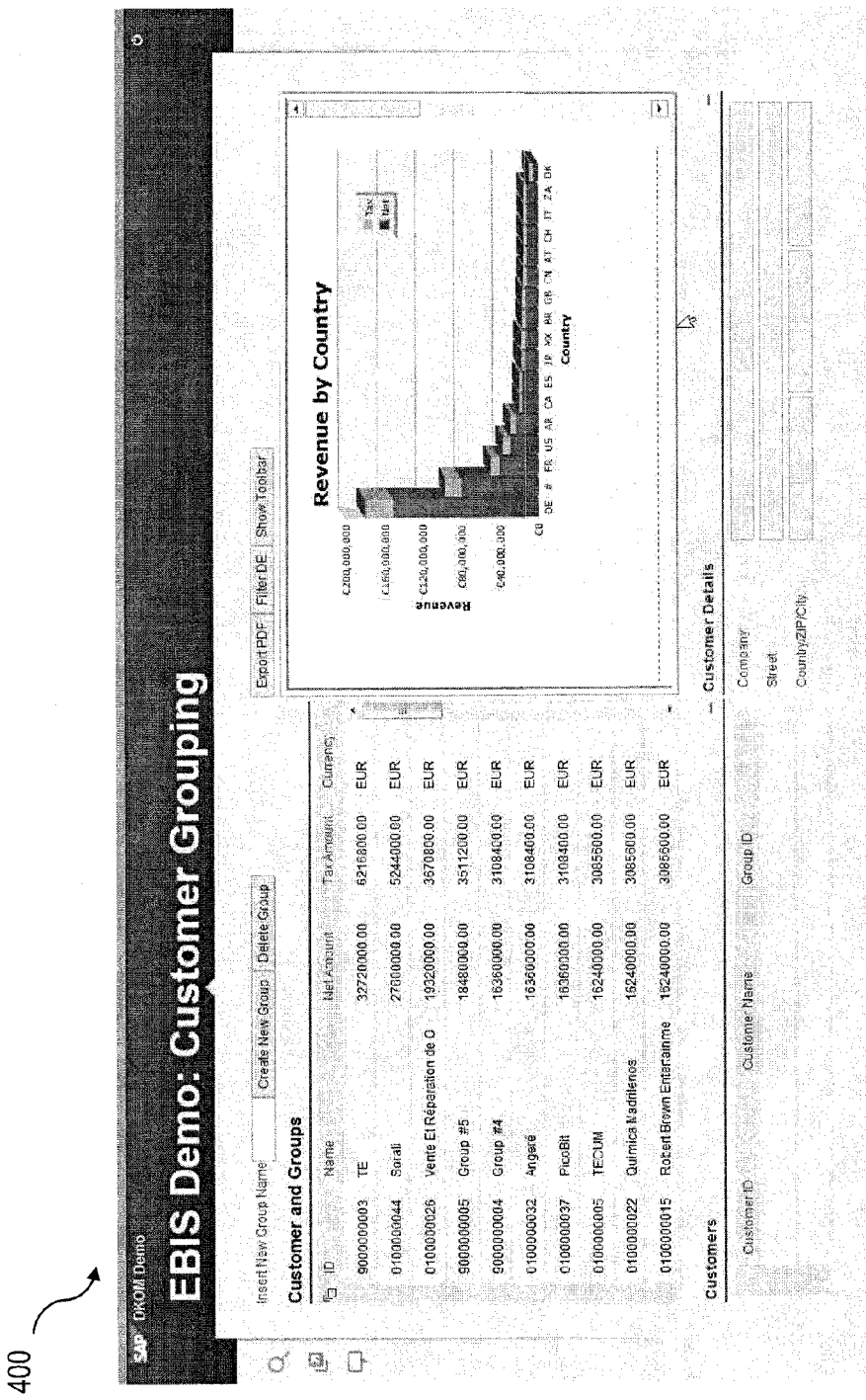
FIG. 4 is a second screenshot illustrating an application enabling transactional record updates and displaying analytical content.

The end user can call an application via a URL and is presented with a logon screen provided by the application platform 120. After successful logon, an application is displayed (see the screenshot 300 of FIG. 3) which can comprise a mix of facilities to process transactional, single-record updates (e.g. creation of sales orders) and facilities to display analytical content (e.g. an overview of all sales orders the end user is responsible for shown per sales region and month). Additionally, the application can provide links that open a new browser window that is filled by "full screen" analytical user interfaces (e.g. a UI that allow modification of the above sales order overview, and drill down by sales region and month as well as modification of this view to display sales over product groups and customer segments and the like).

When using a single-record update functionalities of the application, the analytical parts in the UI can be refreshed immediately to provide the user with direct feedback based on the results of the interaction with the system. This invites the user to then further analyze the aggregated data, derive further findings and again create further single-record updates (i.e., the "insight-to-action" workflow).

Furthermore, it is possible for the user to navigate from an analytical UI or UI building-block to a transactional screen such as the screenshot 200 of FIG. 2 (e.g., in drilling down sales orders per customer in a chart, the user can click on a bar visualizing sales for a customer and navigating to the customer master data of the selected customer).

To make the above seamless for the user, common UI elements like buttons, dropdowns, etc. can be visualized exactly the same regardless of their origin, be it a transactional UI or a UI building-block rendered by EBIS 140. Furthermore, all the settings an end user makes can be reflected in both transactional as well as analytical screen parts (e.g., logon language date/time/currency formatting options, branding changes, etc.).

Developer/Installation.

The developer can install the application platform 120, such an ABAP platform in Eclipse, the real-time analytics platform 160 such as HANA tools, and SAP UI5 tools. Additionally, the developer can install Eclipse-based EBIS clients, such as Crystal Reports Designer and ZEN Designer, which may all run in one Eclipse instance, which can be installed and updated in the same way, and allow navigation between the environments. Additionally, the developer can install BEx Query Designer which comes as part of the BEx tools optional components of SAP GUI.

Content Development.

Assuming that content (e.g, tables/views, attribute/analytical/calculation views) already exists in the column store 164, the developer can install a query such as a BEx Query using BEx Query Designer on top of this content. Next, the developer can switch to a business intelligence application such as Crystal Reports Designer or ZEN Designer, pick the query as a data source for the report or dashboard and design the report or dashboard using these tools. The report can then be saved using a transport system such as an ABAP transport system. For example, initially on $TMP (temporary, local package in ABAP) and then using a BW-specific transaction (BW administrator workbench) it is assigned to a "real" development package and put on an existing or newly created transport request. Lastly, the developer can preview the report including live data in the browser by pressing the preview button in a business application such as Crystal Reports Designer or ZEN Designer.

UI Integration.

The developer can open the UI5 application in the application platform 120, such as ABAP in Eclipse. Either there can be a generic UI5 control to embed business intelligence contents (for example, one could think of a Web Dynpro-based UI building block for EBIS) or the developer can use native HTML5 capabilities to do the embedding. In either case, during runtime, a URL can be created that points to the EBIS 140 and specifies the application type (e.g., Crystal or ZEN) and report/dashboard to be executed. Additionally, there can be a published JavaScript API that allows modification of the business intelligence contents on the browser side (for layout purposes, e.g. show/hide the Crystal Reports toolbar and for data manipulation, filter the view of the report/dashboard according to some criteria, etc.). Additionally, there can be a JavaScript-based eventing mechanism to allow the propagation of changes within the business intelligence component (like the changing of a filter criteria) to the "outside" UI5 application so that it can react accordingly.

Administrator—Software Lifecycle.

From an administrator's viewpoint, the EBIS 140 can be a separate component that is configured to connect to the application platform 140. After installation of the EBIS 140, some post-installation configuration might still be necessary to finalize the initial setup. This is especially true to configure how HTTP requests are dispatched to the EBIS 140, e.g., via an alias in ICF that allows configuring the request routing, manually setting up and configuring a SAP Web Dispatcher as reverse proxy in front of the servers of the application platform 120 and the EBIS 140.

Administrator—Operations.

The integration of the EBIS 140 can be mainly enabled by integrating the EBIS component into a SDK that enables a joint start/stop of the EBIS 140 along with the application platform 120. Also, the SDK can provide a facility for availability monitoring so that the EBIS 140 can show up in a management console of the application platform 120 into which it is integrated. Lastly, the SDK can enable compliance with ITSAM product standard requirements such as trace file access and collection.

Figure 5:
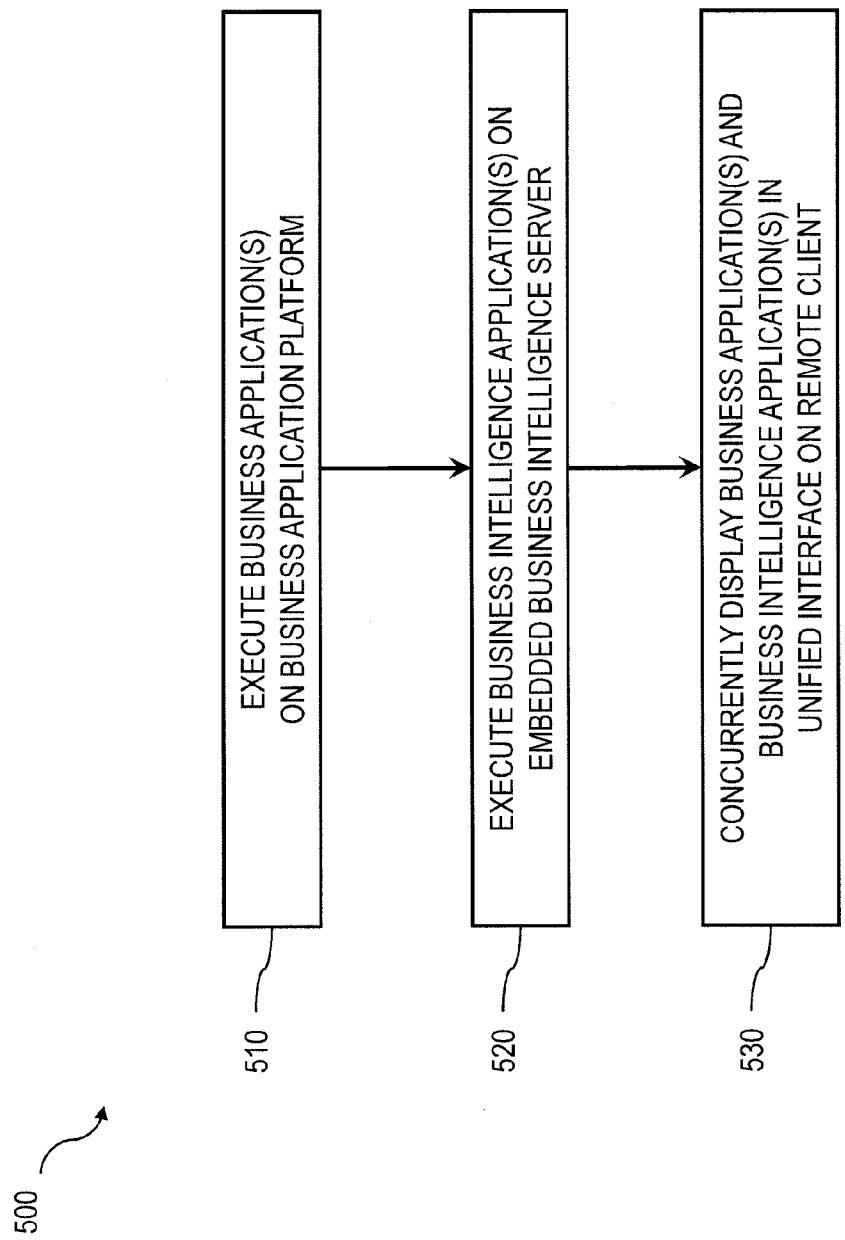
FIG. 5 is a process flow diagram illustrating provision of an embedded business intelligence server.

FIG. 5 is a process flow diagram 500 in which, at 510, one or more business applications are executed on a business application platform. In addition, at 520, one or more business intelligence client applications providing business intelligence functionality are executed via an embedded business intelligence server (EBIS). The EBIS provides an interface to the business application platform so that the business intelligence applications can be executed concurrently with the business applications. A unified interface at the client concurrently displays, at 520, the executing one or more business applications and the executing one or more business intelligence applications.

While the current subject matter describes the use of an ABAP platform with EBIS, it will be appreciated that other types of platforms can integrate EBIS having similar functionality/architecture as an ABAP platform. In addition, references herein to the application platform 140 and the EBIS 140 can relate to both the underlying platform/servers executing such functionality as well as instances of same.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

Although a few variations have been described in detail above, other modifications are possible. For example, the logic flow depicted in the accompanying figures and described herein do not require the particular order shown, or sequential order, to achieve desirable results. Other embodiments may be within the scope of the following claims.

What is claimed is:

1. A system comprising:
at least one first server comprising at least one data processor executing a business application platform providing various business applications for access by at least one remote client; and
at least one second server comprising at least one data processor executing an embedded business intelligence server (EBIS), the EBIS providing an interface between the platform and at least one business intelligence application providing business intelligence functionality;
wherein:
a unified interface rendered on the at least one remote client concurrently provides functionality from the platform and the at least one business intelligence application;
the platform authenticates users on behalf of the EBIS; authentication requests are dispatched to the platform, upon which, the platform issues, for each request, a reentrance ticket to open a connection to the platform within a pre-defined period of time.

2. A system as in claim 1, wherein the platform is an advanced business application programming (ABAP) platform.

3. A system as in claim 1, further comprising: a real-time analytics platform coupled to the platform to provide real-time analytics to the client.

4. A system as in claim 3, wherein the real-time analytics platform comprises an in-memory columnar data store.

5. A system as in claim 1, wherein the platform communicates with the at least one remote client via representational state transfer (RESTful) services.

6. A system as in claim 1, wherein the platform communications with the at least one remote client via JavaScript.

7. A system as in claim 1, wherein the reentrance ticket is handed to the EBIS to establish a remote functional call (RFC) connection to the platform during a lifetime of a corresponding session.

8. The system of claim 1, wherein the reentrance ticket is used as part of an authentication process to establish a JCo/RFC (Remote Function Call) connection between the platform and the EBIS.

9. A method comprising:
executing one or more business applications on a business application platform; and
executing one or more business intelligence client applications providing business intelligence functionality via an embedded business intelligence server (EBIS), the EBIS providing an interface to the platform so that the business intelligence applications can be executed concurrently with the business applications;
concurrently displaying the executing one or more business applications and the executing one or more business intelligence applications in a unified interface at a remote client;
dispatching authentication requests to the platform; and
issuing, by the platform in response to each requests, a reentrance ticket to open a connection to the platform within a pre-defined period of time.

10. A method as in claim 9, wherein the platform is an advanced business application programming (ABAP) platform.

11. A method as in claim 9, wherein a real-time analytics platform is coupled to the platform to provide real-time analytics to the client.

12. A method as in claim 11, wherein the real-time analytics platform comprises an in-memory columnar data store.

13. A method as in claim 9, wherein the platform communicates with the at least one remote client via representational state transfer (RESTful) services.

14. A method as in claim 9, wherein the platform communications with the at least one remote client via JavaScript.

15. A method as in claim 9, further comprising:
handing the reentrance ticket to the EBIS to establish a remote functional call (RFC) connection to the platform during a lifetime of a corresponding session.

16. A non-transitory computer program product storing instructions, which when executed by one or more data processor, result in operations comprising:
executing one or more business applications on an advanced business application programming (ABAP) platform; and
executing one or more business intelligence client applications providing business intelligence functionality via an embedded business intelligence server (EBIS), the
EBIS providing an interface to the platform so that the
business intelligence applications can be executed concurrently with the business applications; and concurrently displaying the executing one or more business applications and the executing one or more business intelligence applications in a unified interface at the client;

dispatching authentication requests to the platform; and issuing, by the platform in response to each requests, a reentrance ticket to open a connection to the platform within a pre-defined period of time.

17. A computer program product as in claim 16, wherein the operations further comprising:

handing the reentrance ticket to the EBIS to establish a remote functional call (RFC) connection to the platform during a lifetime of a corresponding session.

18. A computer program product as in claim 16, wherein the platform is an advanced business application programming (ABAP) platform.

19. A computer program product as in claim 16, wherein a real-time analytics platform is coupled to the platform to provide real-time analytics to the client, the real-time analytics platform comprising an in-memory columnar data store.

20. A computer program product as in claim 16, wherein the platform communicates with the at least one remote client via representational state transfer (RESTful) services.

21. A computer program product as in claim 16, wherein the platform communications with the at least one remote client via JavaScript.

* * * * *